Patented Jan. 29, 1929.

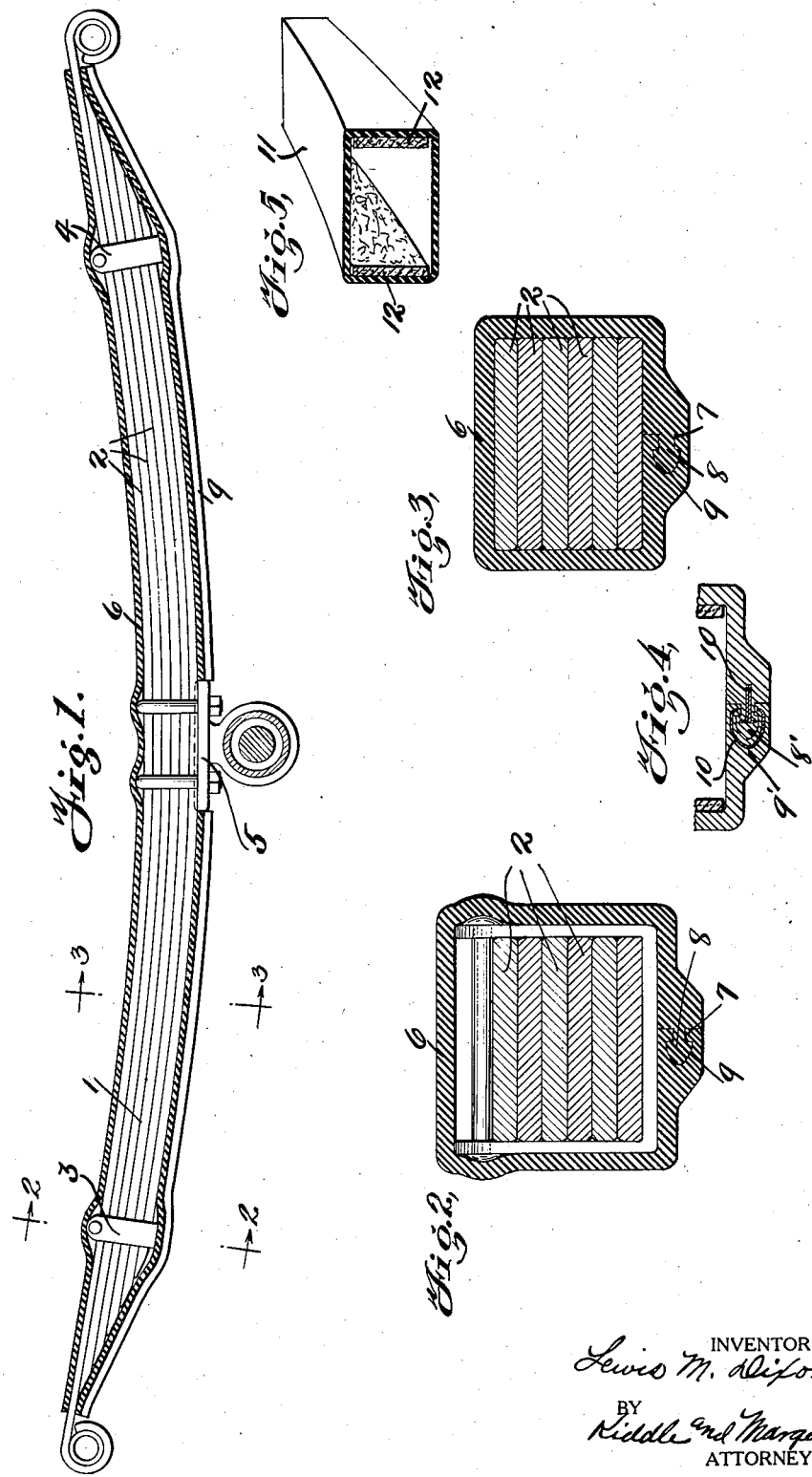

1,700,720

UNITED STATES PATENT OFFICE.

LEWIS M. DIXON, OF BLOOMFIELD, NEW JERSEY, ASSIGNOR, BY DIRECT AND MESNE ASSIGNMENTS, OF ONE-HALF TO STANLEY BOLIN AND ONE-HALF TO LEONARD M. BOLIN, BOTH OF CHICAGO, ILLINOIS.

COVER FOR SPRINGS.

Application filed August 11, 1924. Serial No. 731,264.

My invention relates to covers for springs and is particularly directed to covers for springs such as are employed in automobiles.

Of course, I am aware that covers have been made for springs prior to my invention in a great many forms and varieties. However, these covers have been unsatisfactory for a number of reasons. For instance, when made of leather, they must be laced in place on the spring, thereby presenting an unsightly appearance as well as catching dirt and grease from the roadway, which is hard to remove from the laces. Then again, such covers, and even those made of metal, leak oil or other lubricant employed for lubricating the spring.

One of the objects of my invention, therefore, is to provide a spring cover which will eliminate these drawbacks, and to this end I provide a cover of oil or grease-proof material snugly fitting the spring without lacing, the exterior of the cover presenting a smooth and neat appearance.

A still further object of my invention resides in the provision of a cover having all of the foregoing advantages together with means, if desired, for carrying oil or grease for the purpose of lubricating the spring.

Further objects of my invention will be manifest from the following description and the accompanying drawings, in which drawings—

Fig. 1 is a longitudinal sectional view of a spring provided with my improved cover;

Fig. 2 is a section on the line 2—2 of Fig. 1 looking in the direction of the arrows;

Fig. 3 is a section on the line 3—3 of Fig. 1 looking in the direction of the arrows;

Fig. 4 is a fragmentary sectional view of a modified form of lock joint; and

Fig. 5 is a view in perspective similar to another embodiment of my invention.

Referring to the drawings in detail and first of all to Figs. 1, 2 and 3, 1 designates a vehicle spring of the laminated or leaf type comprising a plurality of leaves 2, end spring clips 3 and 4, and a central clamp 5 by means of which the spring is secured to the axle or other suitable part of a vehicle. 6 designates a flexible cover composed of moulded rubber, for example, adapted to be placed over the spring to cover the same from end to end, the cover being provided with an opening 7 through the wall for this purpose. The adjacent edges of the opening 7 are moulded so as to provide a male joint member 8 and a female joint member 9, which receives the same. If desired, when the cover is being applied, the joint may be brushed with cement to make the cover substantially jointless.

In the modification shown in Fig. 4 the members 8' and 9' of the joint are reinforced by means of spring steel strips 10 or the like, which may be moulded in the rubber in the moulding of the joint.

In Fig. 5 I provide a cover designated 11, comprising a flexible tube of rubber, as distinguished from the member 6 of Fig. 1, which is not tubular in the sense of this description in that an opening 7 is provided through one wall thereof.

This tube 11 is preferably moulded into the shape of the spring, but in any event is large enough to enable the same to be pulled or slipped over the spring before the shackles (not shown) are put in place, so as to telescope and enclose it. The vertical side walls of the tube 11 are lined as indicated at 12 with oil or grease-absorbing material, and before the cover is applied to the spring this lining is saturated with oil or grease to thereby provide a simple method of lubrication for the spring. It is to be understood that the form shown in Figs. 1 to 4, inclusive, may also be provided with a similar lining, if desired.

In the moulding of the cover in either of the forms herein disclosed provision may be made for the spring clips 3 and 4 by providing a slightly enlarged portion or bulge the shape of the spring clips. This bulge will give a neat appearance on the outside of the cover of a smooth swelling.

If desired, extensions similar in construction to the cover may be provided at each end of the spring to enclose the shackles.

It is to be understood that I do not wish to be limited to the precise construction and arrangement shown and described, inasmuch as the same may be varied within the purview of my invention.

What I claim is:

1. A moulded flexible cover for a vehicle spring, formed with means for locking the same in place about a spring.

2. A moulded flexible oil-proof cover for a vehicle spring, formed with an integral lock joint.

3. A cover for a spring comprising a flexible member provided with a longitudinal opening through the wall thereof, the edges of said opening being shaped to form a lock joint.

4. A moulded cover for a spring, formed of flexible oil-proof material, provided with means for lubricating the spring, and a longitudinally extending lock joint for locking the same in place about the spring.

5. A moulded cover for a spring, formed of flexible material and provided with a lock joint, the members of which are reinforced.

6. A cover for a vehicle spring, comprising one piece of moulded flexible material, a lock joint provided thereon for locking the cover about the spring, and lubricating means within said cover.

7. A cover for a vehicle spring, comprising a moulded rubber member having an opening through one wall thereof shaped to form a lock joint for retaining the cover in place on the spring.

8. A spring cover which consists of a casing of soft rubber molded to fit about the spring and slitted longitudinally to permit application to or removal from the spring upon lateral expansion at the slit.

9. A spring cover which consists of a casing of soft rubber molded to fit about the spring and slitted longitudinally to permit application to or removal from the spring upon lateral expansion at the slit, the slit being arranged along the bottom of the casing, and the meeting edges of the casing at the slit being in perpendicular abutment and having formations thereon for cooperation with suitable attaching means.

This specification signed this 8th day of August, 1924.

LEWIS M. DIXON.